(12) United States Patent
Edwards et al.

(10) Patent No.: US 8,773,330 B2
(45) Date of Patent: Jul. 8, 2014

(54) METHOD AND APPARATUS FOR A VIRTUAL MISSION CONTROL STATION

(75) Inventors: Richard E. Edwards, Kent, WA (US); Bryan P. Kesterson, Kent, WA (US); Ramzy Boutros, Maple Valley, WA (US); Mary E. Hornsby, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 691 days.

(21) Appl. No.: 12/491,339

(22) Filed: Jun. 25, 2009

(65) Prior Publication Data

US 2010/0328204 A1 Dec. 30, 2010

(51) Int. Cl.
*G09G 5/00* (2006.01)
*G06F 7/00* (2006.01)
*G06F 17/00* (2006.01)
*G01C 22/00* (2006.01)
*G05D 1/00* (2006.01)

(52) U.S. Cl.
USPC ............... 345/8; 345/7; 345/9; 701/3; 701/23

(58) Field of Classification Search
USPC ............................................. 345/7–9; 701/3
See application file for complete search history.

(56) References Cited

U.S. PATENT DOCUMENTS

| | | | |
|---|---|---|---|
| 2,618,447 A | 11/1952 | Lecarme | |
| 4,930,888 A | 6/1990 | Freisleben et al. | |
| 5,490,784 A * | 2/1996 | Carmein | 434/55 |
| 5,612,718 A * | 3/1997 | Bryan | 345/168 |
| 6,092,058 A | 7/2000 | Smyth | |
| 6,108,031 A | 8/2000 | King et al. | |
| 6,124,954 A | 9/2000 | Popovich et al. | |
| 6,198,462 B1 * | 3/2001 | Daily et al. | 345/8 |
| 6,259,565 B1 * | 7/2001 | Kawamura et al. | 359/630 |
| 6,377,263 B1 | 4/2002 | Falacara et al. | |
| 8,179,366 B2 * | 5/2012 | Richardson et al. | 345/8 |
| 2005/0206583 A1 * | 9/2005 | Lemelson et al. | 345/7 |
| 2006/0192415 A1 * | 8/2006 | Steenson | 297/161 |
| 2007/0024581 A1 * | 2/2007 | Kim et al. | 345/156 |

(Continued)

FOREIGN PATENT DOCUMENTS

WO WO 2004030401 A1 * 4/2004 ............... H04R 1/10

OTHER PUBLICATIONS

Browne, "Head-mounted workstation displays for airborne reconnaissance applications", Proc. of SPIE vol. 3363, Cockpit Displays V: Displays for Defense Applications, ed. D.G. Hopper (Jul. 1998) pp. 348-354.
U.S. Appl. No. 12/175,105, filed Jul. 17, 2008, Offer et al.

*Primary Examiner* — Ryan A Lubit
(74) *Attorney, Agent, or Firm* — Yee & Associates, P.C.

(57) ABSTRACT

A method and apparatus for performing a mission. Information for a mission is received at a control station. The control station comprises a display system, a motion capture system, a number of user input devices, a seat associated with the number of user input devices, and a processor unit. The display system is configured to be worn on the head of an operator and to present a display to the operator. The motion capture system is configured to track movement of the head. The processor unit is configured to execute program code to generate the display and adjust the display presented to the operator in response to detecting movement of the head of the operator. The mission is performed using the information and the control station.

16 Claims, 14 Drawing Sheets

(56) References Cited

U.S. PATENT DOCUMENTS

| | | | |
|---|---|---|---|
| 2007/0032920 A1* | 2/2007 | Dapp et al. | 701/3 |
| 2008/0164729 A1* | 7/2008 | Cavanaugh | 297/162 |
| 2008/0208396 A1* | 8/2008 | Cairola et al. | 345/8 |
| 2009/0045285 A1* | 2/2009 | Mastrolia | 244/122 AG |
| 2009/0257807 A1* | 10/2009 | Woloschyn | 400/489 |
| 2009/0309812 A1* | 12/2009 | Larson et al. | 345/8 |
| 2010/0000526 A1* | 1/2010 | Rittner | 128/202.26 |
| 2010/0148002 A1* | 6/2010 | Park et al. | 244/118.5 |
| 2011/0001796 A1* | 1/2011 | Werjefelt et al. | 348/47 |
| 2013/0169514 A1 | 7/2013 | Edwards et al. | |

* cited by examiner

METHOD AND APPARATUS FOR A VIRTUAL MISSION CONTROL STATION

BACKGROUND INFORMATION

1. Field

The present disclosure relates generally to a control station and, in particular, to a method and apparatus for a control station for use with a platform. Still more particularly, the present disclosure relates to a control station for use with a platform to perform a mission.

2. Background

Control stations are used for various platforms to control systems and functions for the various platforms. For example, control stations in aerial platforms are used to control sensors, weapons, communications systems, safety functions, navigational systems, flight management, and/or any number of other aerial systems and functions. Control stations are also used in other mobile platforms such as, for example, without limitation, ships, submarines, tanks, spacecraft, space stations, and/or other mobile platforms. Further, control stations are also used for non-mobile platforms such as, for example, ground stations and/or other non-mobile platforms. Still further, control stations may be utilized in various military, commercial, and/or space applications.

Currently, control stations are large and heavy. For example, some control stations may weigh as much as 200 pounds. Currently available control stations occupy an area as much as around a 9 square foot base by 5 feet high.

Existing control stations provide limited display areas. These control stations have display systems located within platforms and/or mounted to structures associated with the platforms. This configuration limits the number of display systems that can be viewed simultaneously. Also, this configuration limits the size of the display systems. Mounting the display systems to the structures associated with the platform further decreases floor space in the platform. The limited number of display systems mounted to the structures of the platform also limits the number of simultaneously accessible user functions that can be managed by an operator at the control station.

Further, existing control stations can limit operator mobility within a control station. This limit to operator mobility can result in operator fatigue for missions of long duration. For example, each control station must have a number of input devices arranged in such a way that an operator can perform required functions while seated. The mobility of an operator may be further limited if the operator is to perform functions at the control station while seated with restraints.

Interactions performed by operators can be limited by currently used control stations. Collaborative problem solving and decision making with current control stations requires that operators be located adjacent to each other so they can observe the content of a display. This type of configuration is not always possible due to safety constraints for the platform. These safety constraints may be based on a number of factors, such as turbulence, platform maneuvers, and/or other factors.

Operator interactions also may be limited by space constraints. These space constraints may be caused by the size of current control stations. Weight also may be a limiting factor to the number of control stations that can be placed in a particular location. For example, with aircraft, any additional weight can reduce the performance or range of the aircraft.

Therefore, it would be beneficial to have a method and apparatus that takes into account one or more of the issues discussed above, as well as possibly other issues.

SUMMARY

In one illustrative embodiment, an apparatus comprises a display system, a motion capture system, a number of user input devices, a seat associated with the number of user input devices, and a processor unit. The display system is configured to be worn on the head of an operator and to present a display to the operator. The motion capture system is configured to track movement of the head. The processor unit is in communications with the display system, the motion capture system, and the number of user input devices. The processor unit is configured to execute program code to generate the display and adjust the display presented to the operator in response to detecting movement of the head of the operator.

In another illustrative embodiment, a method is present for performing a mission. Information for a mission is received at a control station. The control station comprises a display system, a motion capture system, a number of user input devices, a seat associated with the number of user input devices, and a processor unit. The display system is configured to be worn on the head of an operator and to present a display to the operator. The motion capture system is configured to track movement of the head. The processor unit is configured to execute program code to generate the display and adjust the display presented to the operator in response to detecting movement of the head of the operator and control inputs from the various input devices. The mission is performed using the information and the control station.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, further objectives, and advantages thereof, will best be understood by reference to the following detailed description of an illustrative embodiment of the present disclosure when read in conjunction with the accompanying drawings, wherein:

DETAILED DESCRIPTION

Figure 1:
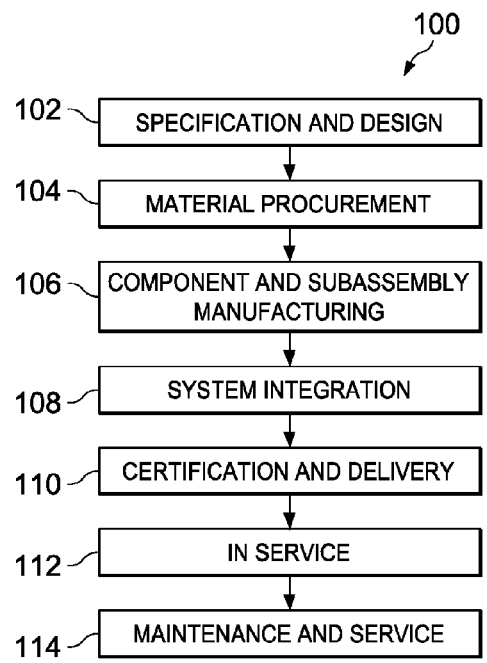
FIG. 1 is a diagram illustrating an aircraft manufacturing and service method in accordance with an illustrative embodiment.
Figure 2:
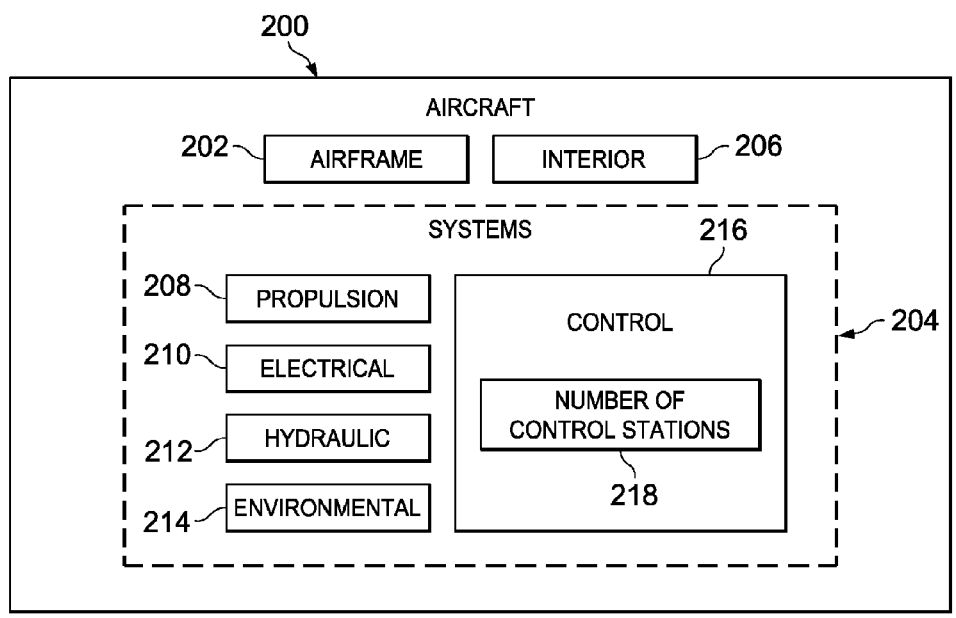
FIG. 2 is a diagram of an aircraft in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an illustrative embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and control system 216. Control system 216 includes number of control stations 218 in these illustrative examples. Any number of other systems may be included. Although an aerospace example is shown, different illustrative embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1. For example, a number of control stations in accordance with one or more illustrative embodiments may be added to aircraft 200 during one or more of the different production stages.

The different illustrative embodiments recognize and take into account a number of different considerations. For example, the different illustrative embodiments take into account and recognize that having a control station in a platform that is lighter in weight than currently available control stations would be desirable. Also, a control station that takes up less space than currently used control stations is useful in platforms with limited space. The different illustrative embodiments also take into account and recognize that a control station that provides increased functionality as compared to currently available control stations is also desirable.

Further, the different illustrative embodiments take into account and recognize that existing control stations have display systems that may use more power than desired. Existing control stations also may generate more heat and have specific requirements for cooling.

Some platforms may have limited power output. For example, an aircraft may have a limited amount of power that can be used for control stations. These power restrictions may limit the number of control stations used with these platforms. The different illustrative embodiments take into account and recognize that control stations with decreased power and/or cooling demands may be desirable. Decreased power demands may allow an increased number of control stations to be used in different platforms.

The different illustrative embodiments also take into account and recognize that existing control stations provide limited display capabilities. For example, space is limited in an aircraft. This limited space may result in fewer and/or smaller displays being presented at a control station in an aircraft than desired.

The different illustrative embodiments also take into account and recognize that existing control stations may not have desired safety features. For example, existing control stations have restraints but do not have oxygen systems that are part of the control stations. Having a control station with an oxygen system associated with the control station is desirable. In these examples, the oxygen system may be associated with the control station by being located in, attached to, part of, or integrated with the control station.

Thus, the different illustrative embodiments provide an apparatus and method for using a control station to perform a mission. Information for a mission is received at a control station. The control station comprises a display system, a motion capture system, a seat, a number of input devices, and a processor unit. The display system is configured to be worn on the head of an operator and to present a display to the operator. The motion capture system is configured to track movement of the head of the operator.

Input from input devices also may be used to adjust the display on the display system. The seat is associated with the number of input devices. The processor is configured to execute program code to generate the display. The processor is also configured to execute program code to adjust the display presented to the operator in response to detecting movement of the head of the operator. The mission is performed using the information and the control station. The display also may be adjusted in response to receiving commands from the number of input devices.

The different illustrative embodiments also take into account and recognize that existing control stations may not be adjustable for a full range of desired configurations for all potential operators. The different illustrative embodiments also recognize that this situation may contribute to operator fatigue and decreased operator performance. As a result, having a control station with a number of adjustable configurations is desirable.

Figure 3:
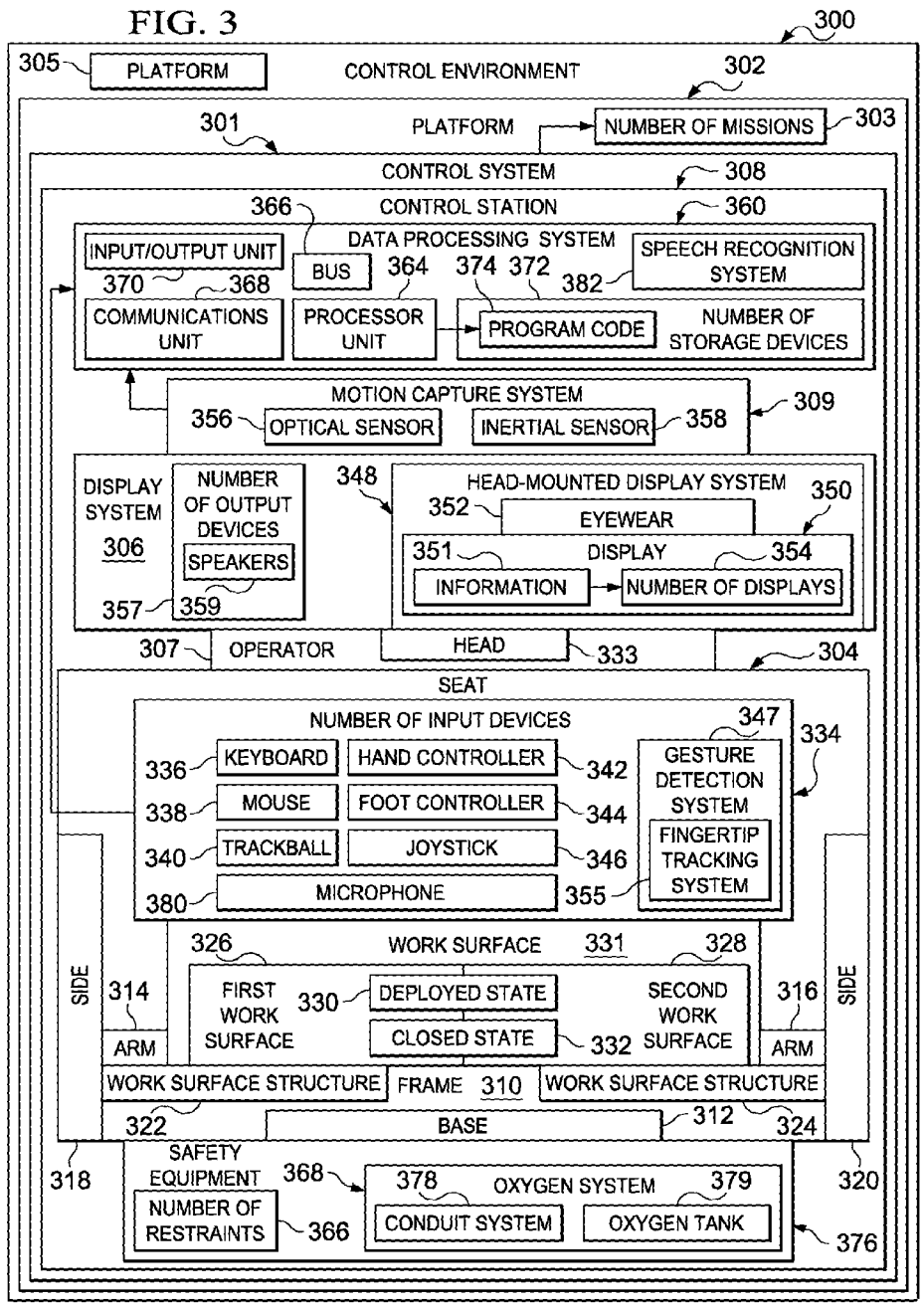
FIG. 3 is a diagram of a control environment in accordance with an illustrative embodiment.

With reference now to FIG. 3, a diagram of a control environment is depicted in accordance with an illustrative embodiment. Control environment 300 is an example of a control environment that may be implemented in aircraft 200 in FIG. 2. Control environment 300 includes control system 301 in these illustrative embodiments.

Control system 301 is located in platform 302. Control system 301 is used to perform number of missions 303. As used herein, a number of items refers to one or more items. For example, number of missions 303 is one or more missions.

In these illustrative examples, control system 301 may control operation of platform 302 as part of performing number of missions 303. Platform 302 may be, for example, without limitation, aircraft 200 in FIG. 2. In other examples, control environment 300 may receive or transmit information. As another illustrative example, control system 301 is located in platform 302 and controls the operation of platform 305. In this example, platform 302 may be a ground station, while platform 305 may be an unmanned aerial vehicle, a satellite, and/or some other suitable platform.

In these illustrative examples, control system 301 includes control station 308. Operator 307 uses control station 308 to perform number of missions 303.

In this illustrative example, control station 308 includes seat 304, display system 306, motion capture system 309, and data processing system 360. Seat 304 is an adjustable seat in these examples. In other words, seat 304 may be adjusted in a number of dimensions. Seat 304 may be adjusted to provide improved support for operator 307. Seat 304 includes frame 310. Frame 310 includes base 312, arm 314, and arm 316. Arm 314 may be located on side 318 of seat 304, and arm 316 may be located on side 320 of seat 304.

In this depicted example, work surface structure 322 may be associated with side 318 of seat 304. Work surface structure 324 may be associated with side 320 of seat 304 in these illustrative examples. For example, work surface structure 324 may be associated with side 320 of seat 304 by being secured to side 320, bonded to side 320, fastened to side 320, and/or connected to side 320 in some other suitable manner. Further, work surface structure 324 may be associated with side 320 by being formed as part of and/or as an extension of side 320 of seat 304. In these examples, work surface structure 322 and work surface structure 324 are attached to frame 310 at arm 314 and arm 316, respectively.

Work surface structure 322 and work surface structure 324 are moveably attached to frame 310 of seat 304. In these examples, work surface structure 322 and work surface structure 324 may be moved horizontally and/or vertically along frame 310. Work surface structures 322 and 324 may be, for example, without limitation, cases, encasings, holders, and/or some other suitable type of structure.

Work surface structure 322 is associated with first work surface 326, and work surface structure 324 is associated with second work surface 328. First work surface 326 and second work surface 328 are configured to slide along arm 314 and arm 316, respectively. In this manner, first work surface 326 and second work surface 328 may be adjusted along arm 314 and arm 316. Further, first work surface 326 and/or second work surface 328 may be adjusted by moving work surface structure 322 and/or work surface structure 324, respectively, along frame 310.

In these examples, first work surface 326 and second work surface 328 may have deployed state 330 and closed state 332. In deployed state 330, first work surface 326 and second work surface 328 form work surface 331. Work surface 331 may be adjusted into a number of configurations. In this illustrative example, these configurations may be formed by moving work surface structure 322 and/or work surface structure 324 and/or sliding first work surface 326 and/or second work surface 328. Work surface 331 may be adjusted to accommodate operator 307. The adjustments for work surface 331 may allow work surface 331 to be used by a larger number of operators.

In these illustrative examples, work surface 331 is associated with number of input devices 334. Number of input devices 334 may include, for example, without limitation, keyboard 336, mouse 338, trackball 340, hand controller 342, joy stick 346, gesture detection system 347, and/or some other suitable user input device.

First work surface 326 and second work surface 328 may be configured to hold keyboard 336, mouse 338, and/or joystick 346 in these illustrative embodiments. In some illustrative embodiments, a first portion of keyboard 336 may be associated with first work surface 326, and a second portion of keyboard 336 may be associated with second work surface 328.

Of course, number of input devices 334 may be placed in other locations. For example, number of input devices 334 also may include foot controller 344, which may be attached to a lower portion of seat 304. Foot controller 344 may be, for example, a foot pedal, a foot switch, and/or some other suitable input device.

Display system 306 is a device that is configured to be worn on head 333 of operator 307 and to present display 350 to operator 307. For example, display system 306 may be head-mounted display system 348. In these examples, display 350 presents information 351 to operator 307. For example, display 350 presents number of displays 354.

Number of displays 354 may be, for example, a virtual representation of a number of physical displays, windows, and/or some other suitable form for presenting information 351 to operator 307. Number of displays 354 provides operator 307 a capability to communicate within and between platform 302 and/or platform 305. This communication may include the exchange of information 351. The information may include data, images, video, commands, messages, and/or other suitable forms of information 351. Information 351 may also be, for example, a map, status information, a moving map, and/or another suitable form of information 351.

In these illustrative examples, head-mounted display system 348 may include eyewear 352, which may allow operator 307 to view display 350. In these depicted examples, display system 306 may also include number of output devices 357. Number of output devices 357 may be, for example, without limitation, speakers 359. Speakers 359 may present information 351 in an audio format. Speakers 359 may be integrated or otherwise associated with eyewear 352 of head-mounted display system 348. Operator 307 may use number of input devices 334 to command and control these systems with display 350.

Operator 307 uses number of input devices 334 to adjust display 350. For example, operator 307 may use number of input devices 334 to select a particular set of displays within number of displays 354 to view. Operator 307 may also use number of input devices 334 to adjust the size, orientation, arrangement, and/or some other suitable feature for number of displays 354 and display 350.

Further, operator 307 may use gesture detection system 347 to control the operation of platform 302 and/or platform 305. In some illustrative embodiments, gesture detection system 347 includes fingertip tracking system 355. Fingertip tracking system 355 allows display 350 to be used as a touch screen display. Fingertip tracking system 355 tracks the movement and position of a finger of operator 307. In this manner, fingertip tracking system 355 may allow display 350 to emulate a touch screen display.

In these illustrative examples, motion capture system 309 is configured to track movement of head 333 of operator 307 while operator 307 wears head-mounted display system 348. In this illustrative example, motion capture system 309 includes optical sensor 356, inertial sensor 358, and/or some other suitable type of sensor. Optical sensor 356 is used to track the range of motion of head 333 of operator 307 and head-mounted display system 348. Inertial sensor 358 is used to track motion to the side of head 333 of operator 307 and head-mounted display system 348. Motion capture system 309 sends information about the position of head 333 to a data processing system such as, for example, data processing system 360.

In these illustrative examples, data processing system 360 is associated with control station 308. In these illustrative examples, data processing system 360 may be integrated with seat 304 and/or display system 306. In other illustrative examples, data processing system 360 may be located remotely from control station 308. Data processing system 360 includes processor unit 364, bus 366, communications unit 368, input/output unit 370, and number of storage devices 372. Number of storage devices 372 may be selected from at least one of a random access memory, a read only memory, a hard disk drive, a solid state disk drive, an optical drive, a flash memory, and/or some other type of storage device.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

Program code 374 is stored on at least one of number of storage devices 372. Program code 374 is in a functional form. Processor unit 364 is configured to execute program code 374.

Program code 374 may be used to generate and present display 350 and number of displays 354 within display 350. Program code 374 may also be used to adjust display 350. These adjustments may be made in response to movement of head 333 of operator 307 and/or input from motion capture system 309. In this manner, dizziness and uneasiness that may occur from display 350 moving with movement of head 333 may be reduced and/or prevented. Display 350 is stabilized during movement of head 333 of operator 307 to reduce and/or prevent undesired levels of discomfort to operator 307. Further, program code 374 may be executed to adjust display 350 in response to input from operator 307 using number of input devices 334.

In these illustrative examples, control station 308 also includes safety equipment 376 associated with seat 304. Safety equipment 376 may include, for example, without limitation, at least one of number of restraints 366, oxygen system 368, and other suitable types of safety equipment. Number of restraints 366 may take the form of, for example, a safety belt, a harness, and/or some other suitable type of restraint system.

In these examples, oxygen system 368 includes conduit system 378. Conduit system 378 is configured to be connected to an oxygen source such as, for example, oxygen tank 379. Conduit system 378 is a collection of tubing that can provide a flow of oxygen from oxygen tank 379 to operator 307. In these illustrative examples, oxygen tank 379 is associated with seat 304. In other words, oxygen tank 379 may be attached to seat 304, located within seat 304, made part of seat 304, or associated with seat 304 in some other suitable manner.

The illustration of control environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, control environment 300 may include a number of additional control stations in addition to control station 308. In some illustrative embodiments, processor unit 364 may be located in at least one of data processing system 360 associated with seat 304, display system 306, a remote data processing system, and/or some other suitable location. Other components of data processing system 360 also may be located within display system 306, not needed, or associated with seat 304 in these examples.

In some illustrative embodiments, motion capture system 309 may be part of head-mounted display system 348. In other illustrative embodiments, number of input devices 334 may include a microphone, such as microphone 380. In some examples, microphone 380 may be integrated with head-mounted display system 348. Microphone 380 may send input to processor unit 364. Operator 307 may use microphone 380 to adjust display 350 and/or information 351 presented on display 350. Operator 307 also may use microphone 380 to send commands to display 350. Input from microphone 380 may be recognized by speech recognition system 382. Speech recognition system 382 may be a part of data processing system 360 in these examples.

In yet other illustrative embodiments, oxygen system 368 may have conduit system 378 configured to be connected to an oxygen source other than or in addition to oxygen tank 379. For example, conduit system 378 may be configured to be connected to an oxygen source in platform 302. In still yet other illustrative embodiments, work surface 331 may be formed by a single work surface that may deploy from one side of seat 304.

Figure 4:
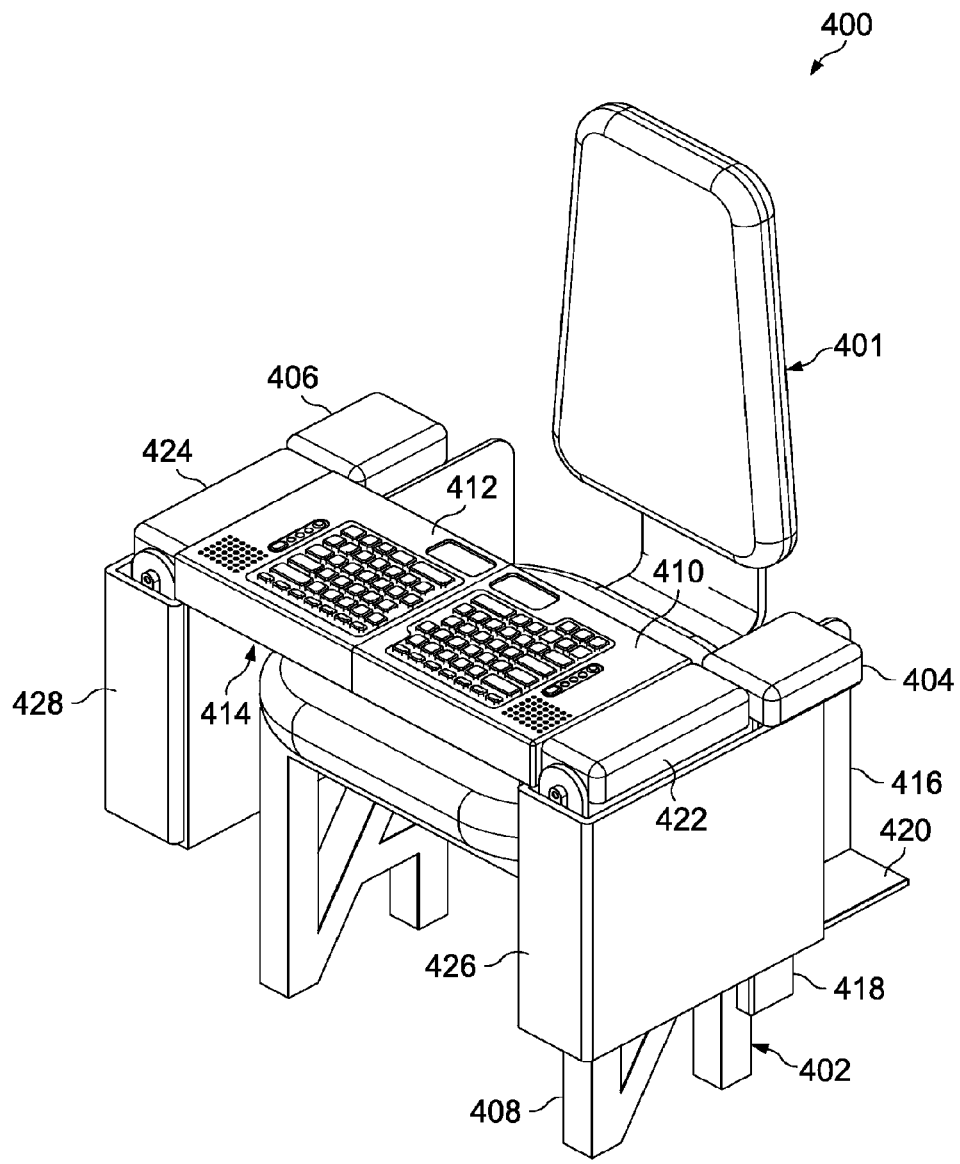
FIG. 4 is a diagram of a seat for a control station in accordance with an illustrative embodiment.

With reference now to FIG. 4, a diagram of a seat for a control station is depicted in accordance with an illustrative embodiment. In this illustrative example, control station 400 with seat 401 is an example of one implementation of control station 308 in FIG. 3.

In this illustrative example, seat 401 has frame 402 with arm 404, arm 406, and base 408. Seat 401 also has work surface 410 associated with arm 404, and work surface 412 associated with arm 406. In these illustrative examples, work surface 410 is attached to arm 404, and work surface 412 is attached to arm 406. In other examples, work surface 410 and work surface 412 may be formed as a part of arm 404 and arm 406.

In these illustrative examples, work surface 410 and work surface 412 are moveably attached to arm 404 and arm 406, respectively. Further, work surface 410 and work surface 412 are configured to move between deployed and closed states. In the deployed state, work surface 410 and work surface 412 form work surface 414.

As depicted, seat 401 has sliding pan 416 and another sliding pan (not shown in this view) on the other side of seat 401. Sliding pan 416 may move vertically along frame 402. The vertical movement of sliding pan 416 is driven by actuator 418 attached to frame 402. In a similar manner, another actuator (not shown in this view) attached to frame 402 may drive vertical movement of the other sliding pan for seat 401.

Further, sliding pan 416 and the other sliding pan of seat 401 have horizontal slides, such as horizontal slides 420 for sliding pan 416. Work surface structure 426 and work surface structure 428 are configured to slide horizontally along horizontal slides 420 on sliding pan 416 and the horizontal slides on the other sliding pan for seat 401, respectively.

In this illustrative example, armrest 422 is attached to sliding pan 416, and armrest 424 is attached to the other sliding pan of seat 401. These armrests provide support for an operator as armrests. Also, these armrests provide support for work surface 410 and work surface 412 in their deployed state.

Work surface structure 426 and work surface structure 428 may have a number of deployment mechanisms capable of deploying work surface 410 and work surface 412, respectively. Work surface 410 and work surface 412 are deployed to form work surface 414.

Figure 5:
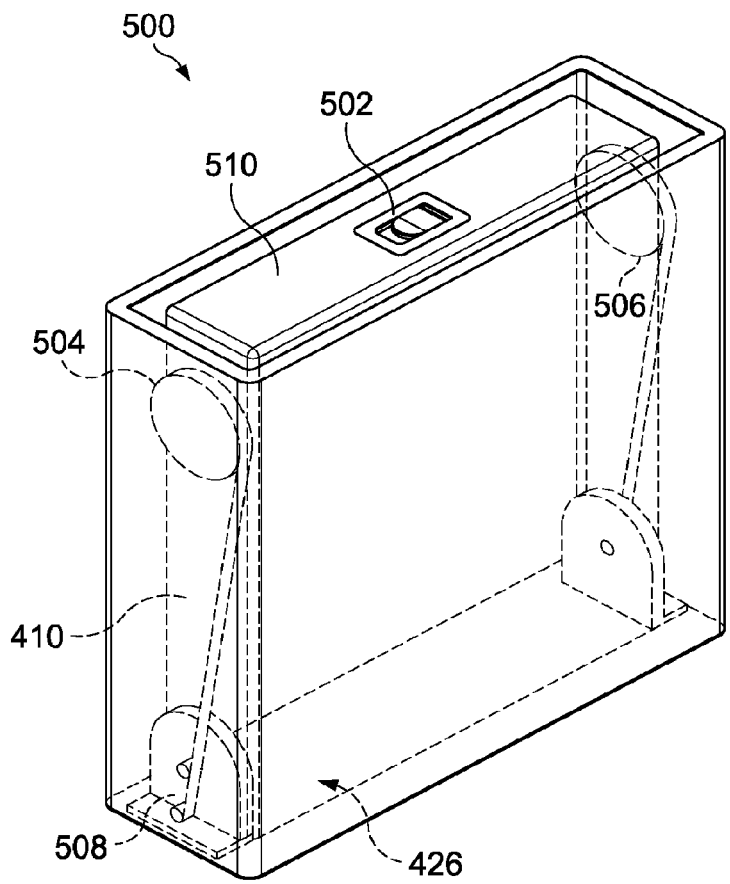
FIG. 5 is a diagram of a deployment mechanism for a work surface structure in accordance with an illustrative embodiment.

With reference now to FIG. 5, a diagram of a deployment mechanism for a work surface structure is depicted in accordance with an illustrative embodiment. In this illustrative example, work surface structure 426 of seat 400 in FIG. 4 is depicted with work surface 410 in a closed state.

Work surface structure 426 has deployment mechanism 500 with latch 502, spring 504, and spring 506. When latch 502 is released, spring 504 and spring 506 cause work surface 410 to move into a deployed state.

In this illustrative example, spring 504 and spring 506 act as pivot points for work surface 410. For example, when latch 502 is released, work surface 410 rotates about spring 504 and spring 506. In other words, work surface 410 rotates about an axis through spring 504 and spring 506. This rotation causes end 508 of work surface 410 to be at substantially the same level as end 510 of work surface 410 in the deployed state. In a similar manner, work surface 412 in FIG. 4 may be moved into a deployed state using a deployment mechanism for work surface structure 428 in FIG. 4.

In other illustrative examples, work surface 410 in a deployed state may be mechanically and/or electrically rotated about the axis extending through spring 504 and spring 506 to move work surface 410 from a deployed state into a closed state.

In some illustrative examples, an operator in seat 400 may slide work surface structure 426 along horizontal slides 420 for sliding pan 416 in FIG. 4 before moving work surface 410 between the deployed state and the closed state. For example, the sliding of work surface structure 426 along horizontal slides 420 may be performed to prevent contact between work surface 410 and the legs of an operator during rotation of work surface 410 about spring 504 and spring 506.

Figure 6:
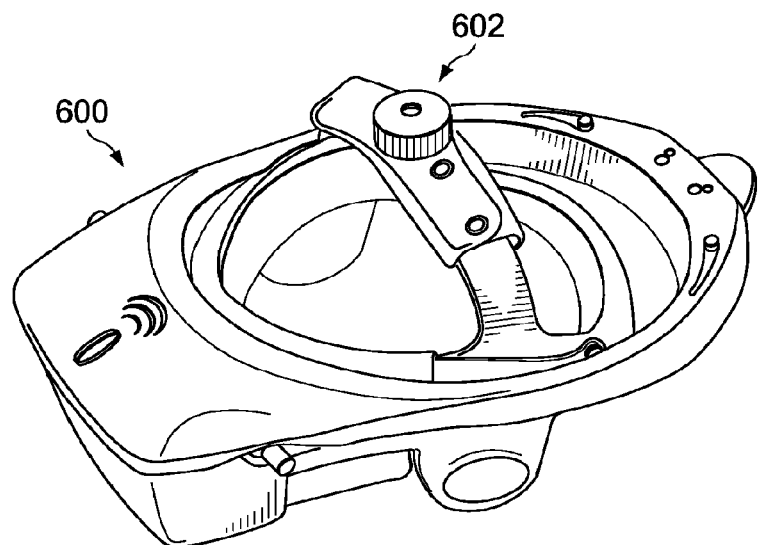
FIG. 6 is a diagram of a head-mounted display system in accordance with an illustrative embodiment.

With reference now to FIG. 6, a diagram of a head-mounted display system is depicted in accordance with an illustrative embodiment. In this illustrative example, head-mounted display system 600 is an example of one implementation for head-mounted display system 348 in FIG. 3. Head-mounted display system 600 may be used to display a virtual display such as, for example, display 350 in FIG. 3. In some examples, a motion capture system, such as motion capture system 309 in FIG. 3, may be attached at end 602 of head-mounted display system 600.

Figure 7:
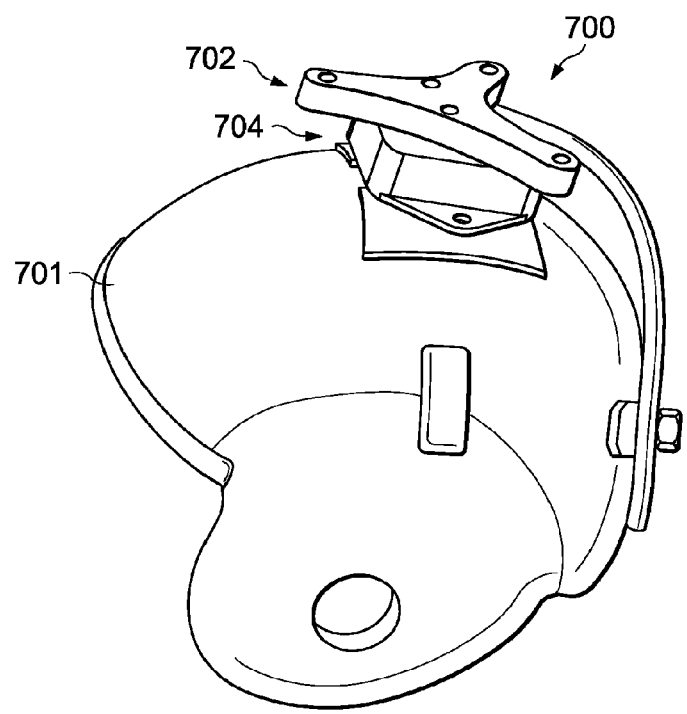
FIG. 7 is a diagram of a motion capture system in accordance with an illustrative embodiment.

With reference now to FIG. 7, a diagram of a motion capture system is depicted in accordance with an illustrative embodiment. In this illustrative example, motion capture system 700 is an example of one implementation for motion capture system 309 in FIG. 3. In this example, motion capture system 700 is attached to headset 701. In other examples, motion capture system 700 may be attached to a headset, such as head-mounted display system 600 in FIG. 6. More specifically, motion capture system 700 may be attached to end 602 of head-mounted display system 600 in FIG. 6.

As depicted, motion capture system 700 has optical sensor 702 and inertial sensor 704. Optical sensor 702 and inertial sensor 704 may be used together to track the position of the head of an operator of headset 701. In some illustrative embodiments, tracking motion to the side of the head may be unnecessary. In these examples, inertial sensor 704 may not be needed, and motion tracking with optical sensor 702 may be sufficient.

Figure 8:
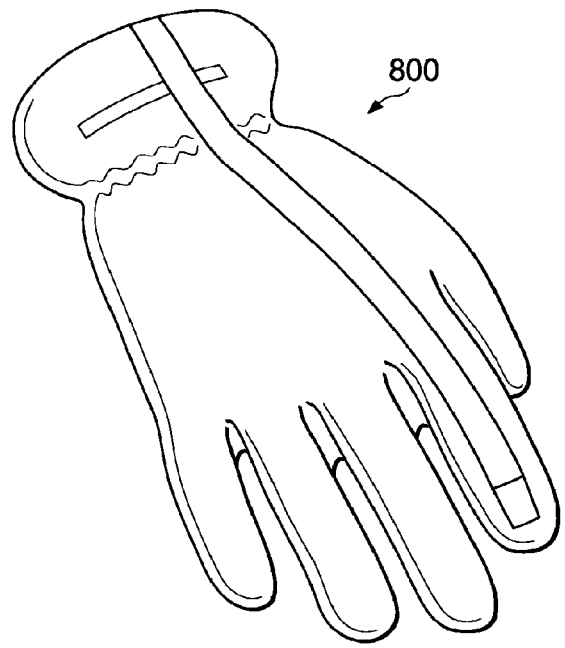
FIG. 8 is a diagram of a fingertip tracking system in accordance with an illustrative embodiment.

With reference now to FIG. 8, a diagram of a fingertip tracking system is depicted in accordance with an illustrative embodiment. In this illustrative example, fingertip tracking system 800 is an example of one implementation for fingertip tracking system 359 in FIG. 3. As one example, fingertip tracking system 800 may be associated with a seat of a control station by being connected to a data processing system such as, for example, data processing system 360 in FIG. 3. In other examples, fingertip tracking system 800 may be associated with other components of control station 308 in FIG. 3.

Fingertip tracking system 800 may be used to track the movement and position of the finger of an operator. For example, a head-mounted display system, such as head-mounted display system 600, may provide a virtual display capable of touch screen emulation. Fingertip tracking system 800 may allow the emulation of a touch screen display with this virtual display.

Figure 9:
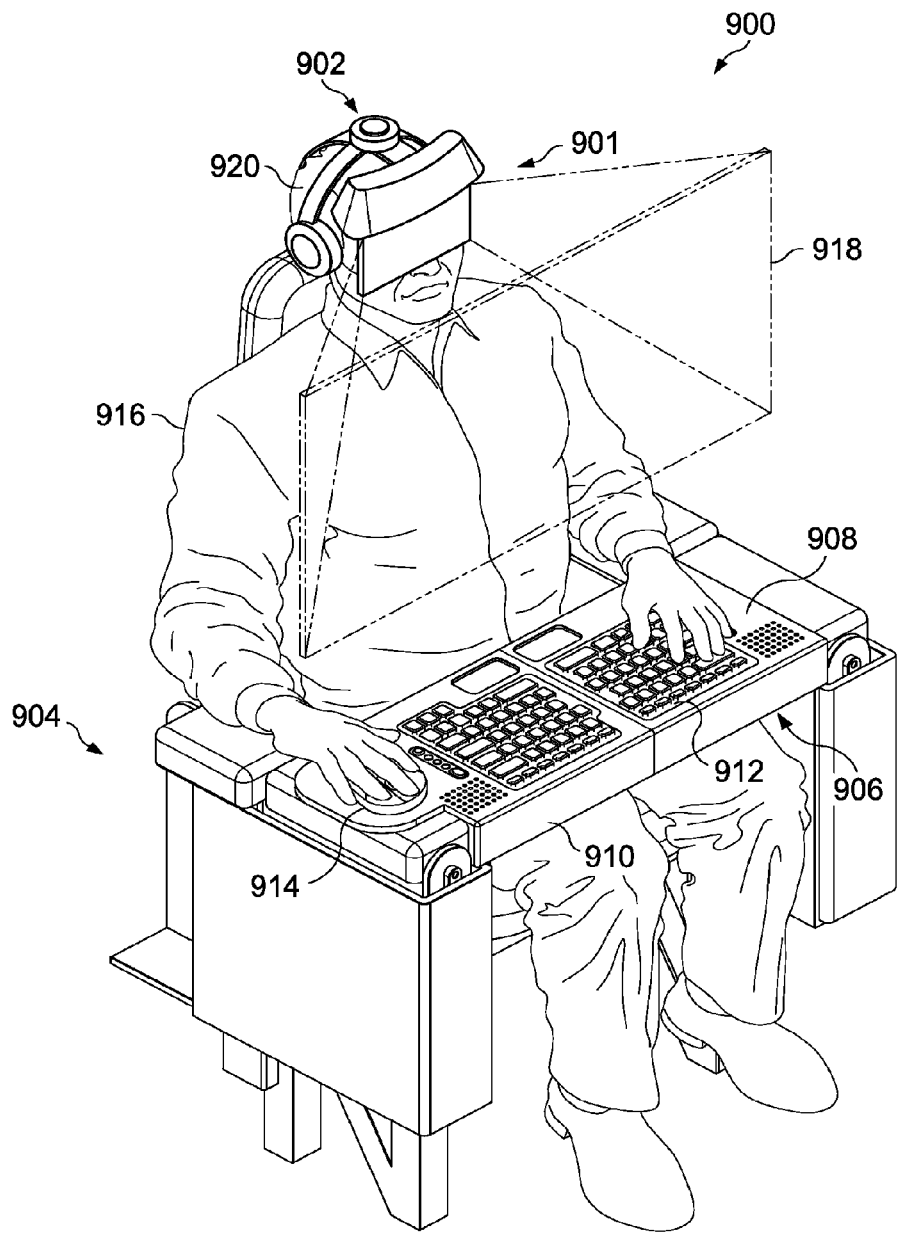
FIG. 9 is a diagram of an operator using a control station in accordance with an illustrative embodiment.

With reference now to FIG. 9, a diagram of an operator using a control station is depicted in accordance with an illustrative embodiment. In this illustrative example, control station 900 is an example of one implementation for control station 308 in FIG. 3. In this illustrative example, control station 900 includes head-mounted display system 901, motion capture system 902 attached to head-mounted display system 901, and seat 904.

Seat 904 includes work table 906 formed by work surface 908 and work surface 910 in a deployed state. In this example, work table 906 is configured to hold keyboard 912 and mouse 914.

Operator 916 uses head-mounted display system 901 to view display 918. Display 918 is not physically present. Instead, the illustration of display 918 is an example of a display that would appear to operator 916 using head-mounted display system 901. In other words, display 918 is a virtual representation of a physical display window.

In this illustrative example, display 918 is stabilized in three dimensions using motion capture system 902. In other words, operator 916 may move, but display 918 remains stationary with respect to control station 900. Motion capture system 902 tracks movement of head 920 of operator 916 to stabilize display 918. Display 918 is only capable of being viewed by operator 916 through head-mounted display system 901.

Figure 10:
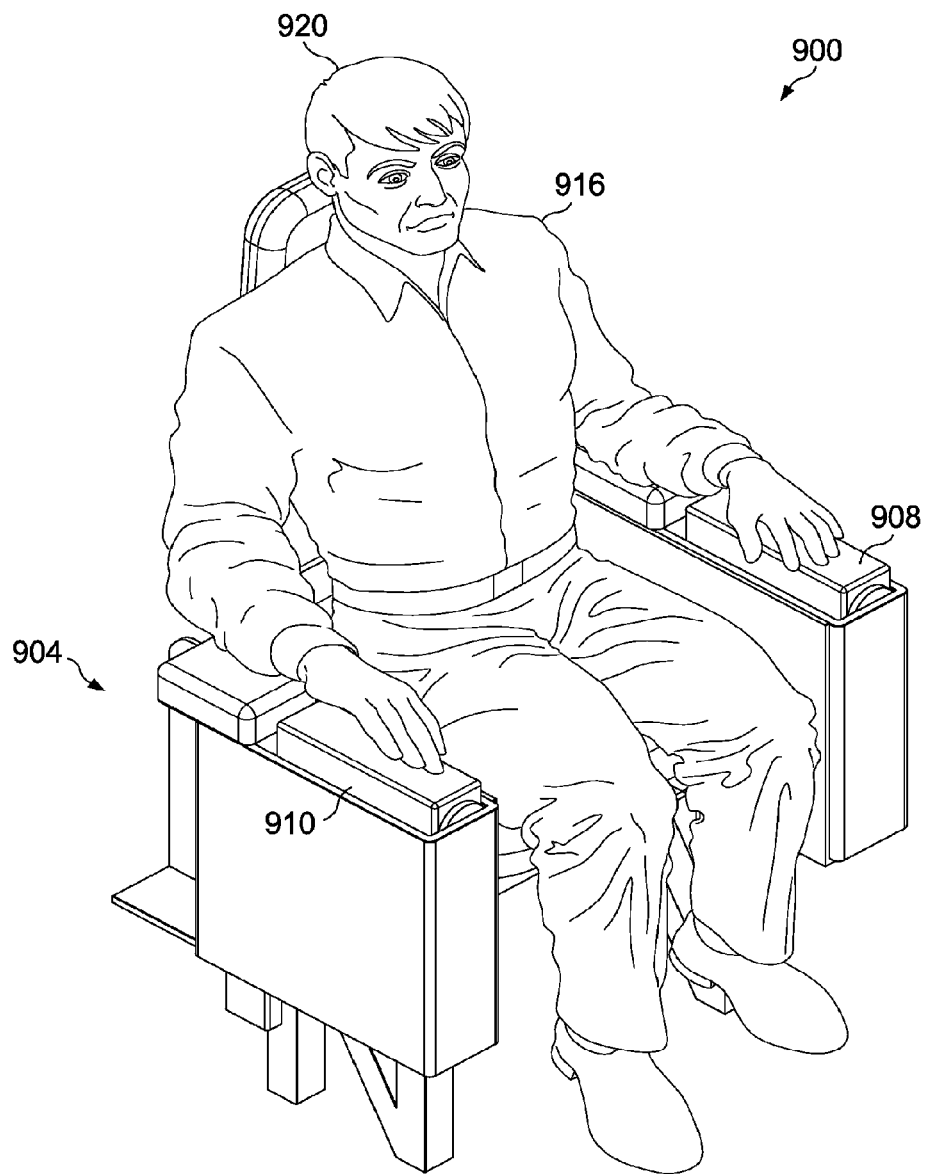
FIG. 10 is a diagram of an operator in a seat in accordance with an illustrative embodiment.

With reference now to FIG. 10, a diagram of operator 916 in seat 904 from FIG. 9 is depicted in accordance with an illustrative embodiment. In this illustrative example, operator 916 is in seat 904 with work surface 908 and work surface 910 in closed states.

Figure 11:
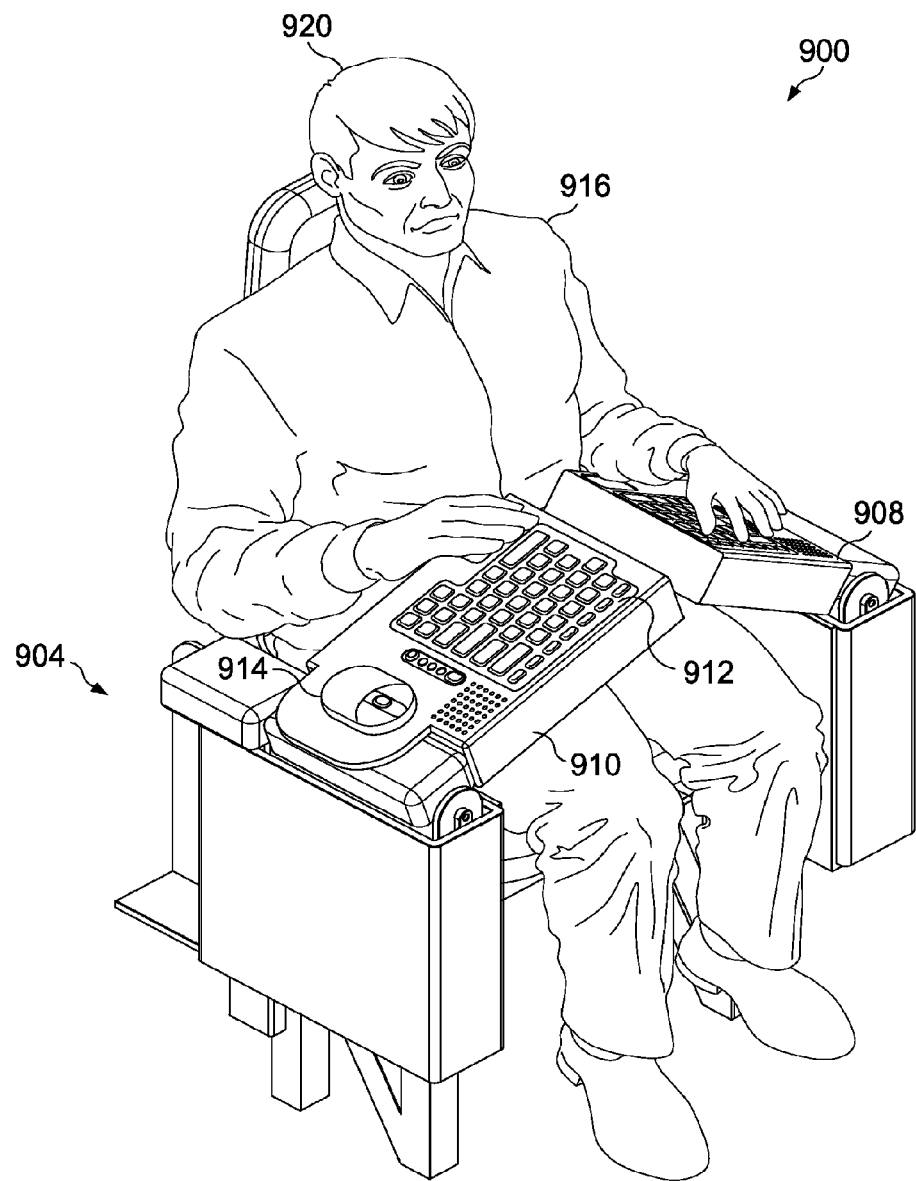
FIG. 11 is a diagram of an operator in a seat in accordance with an illustrative embodiment.

With reference now to FIG. 11, a diagram of operator 916 in seat 904 from FIG. 9 is depicted in accordance with an illustrative embodiment. In this illustrative example, another view of operator 916 in seat 904 is depicted with work surface 908 and work surface 910 in a partially deployed state.

Figure 12:
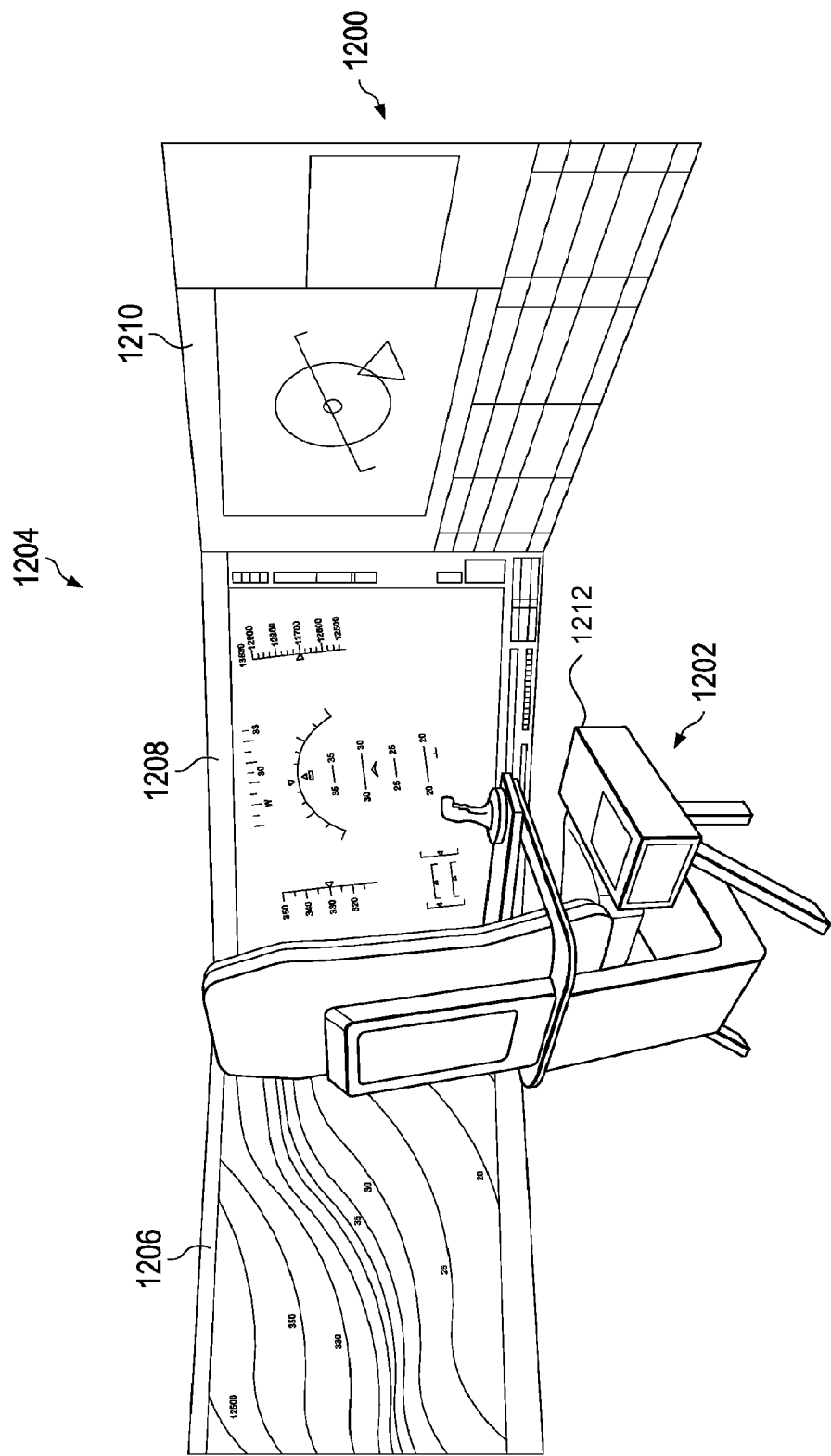
FIG. 12 is a diagram of a control station in accordance with an illustrative embodiment.

With reference now to FIG. 12, a diagram of a control station is depicted in accordance with an illustrative embodiment. In this illustrative example, control station 1200 is an example of one implementation for control station 308 in FIG. 3. Further, seat 1202 is an example of one implementation for seat 304 in FIG. 3. Still further, oxygen system 1212 is an example of one implementation for oxygen system 368 in FIG. 3.

In this illustrative example, virtual display 1204 is an example of one implementation for display 350 in FIG. 3. Virtual display 1204, in this illustrative example, includes window 1206, window 1208, and window 1210. As depicted, these displays are illustrated in a configuration as the displays would appear to an operator using a head-mounted display system, such as head-mounted display system 348 in FIG. 3, while in seat 1202. Windows 1206, 1208, and 1210 are virtual representations of physical windows.

Figure 13:
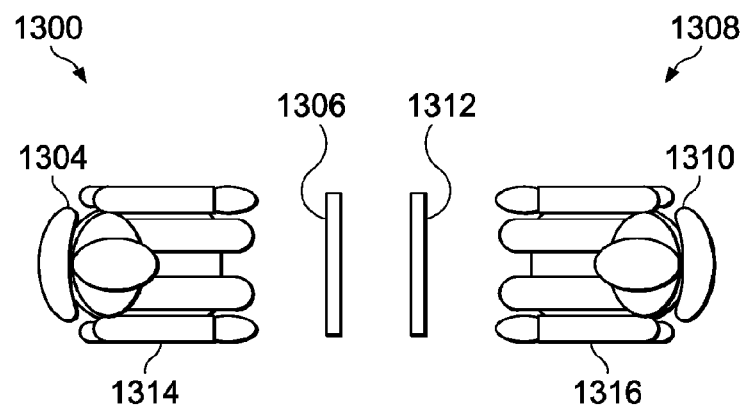
FIG. 13 is a diagram of a seating arrangement for control stations in accordance with an illustrative embodiment.

With reference now to FIG. 13, a diagram of a seating arrangement for control stations is depicted in accordance with an illustrative embodiment. In this illustrative example, control station 1300 includes seat 1304 and display 1306, and control station 1308 includes seat 1310 and display 1312.

In this example, seat 1304 and seat 1310 are positioned directly across from each other. In this type of arrangement, operator 1314 and operator 1316 may be unable to view each other while viewing display 1306 and display 1312, respectively. A control may be used to reconfigure the arrangement of windows within displays 1306 and 1312 to allow operators 1314 and 1316 to see each other. The windows within displays 1306 and 1312 may be reconfigured to move all windows towards the outside of the field of view of the operators.

Figure 14:
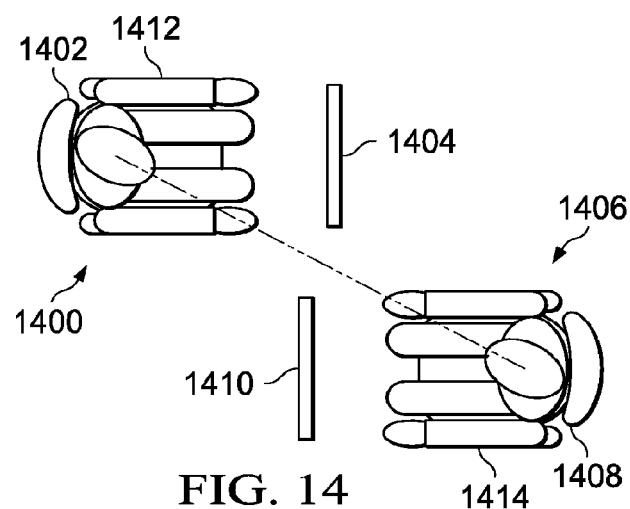
FIG. 14 is a diagram of a seating arrangement for control stations in accordance with an illustrative embodiment.

With reference now to FIG. 14, a diagram of a seating arrangement for control stations is depicted in accordance with an illustrative embodiment. In this illustrative example, another configuration for a control station is depicted. In this illustrative example, control station 1400 includes seat 1402 and display 1404, and control station 1406 includes seat 1408 and display 1410. In this example, seat 1402 and seat 1408 are arranged at an offset configuration. This configuration allows operator 1412 and operator 1414 to see and interact with each other by turning their heads.

Figure 15:
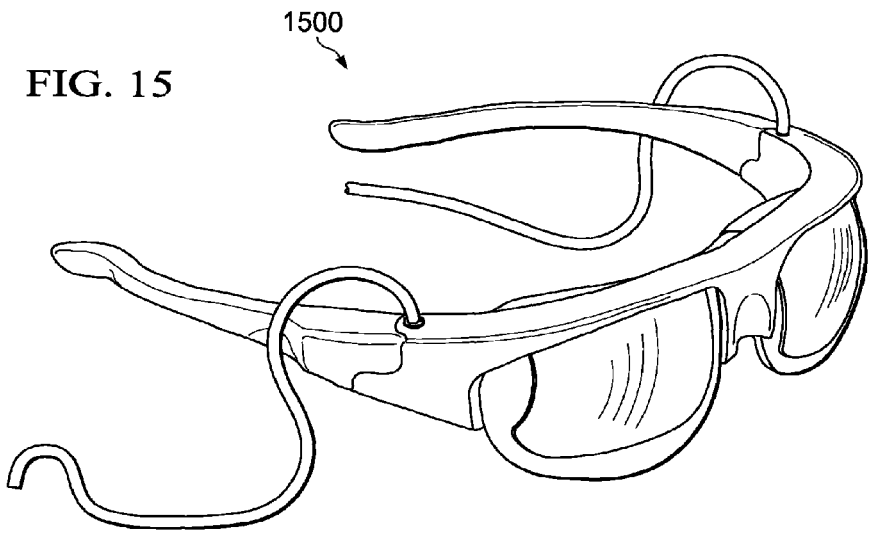
FIG. 15 is a diagram of a head-mounted display system in accordance with an illustrative embodiment.

Turning now to FIG. 15, a diagram of a head-mounted display system is depicted in accordance with an illustrative embodiment. In this example, head-mounted display system 1500 is an example of one implementation for head-mounted display system 348 in FIG. 3. Head-mounted display system 1500 is an example of a LightVu display system as manufactured by Mirage Innovations, Ltd.

Figure 16:
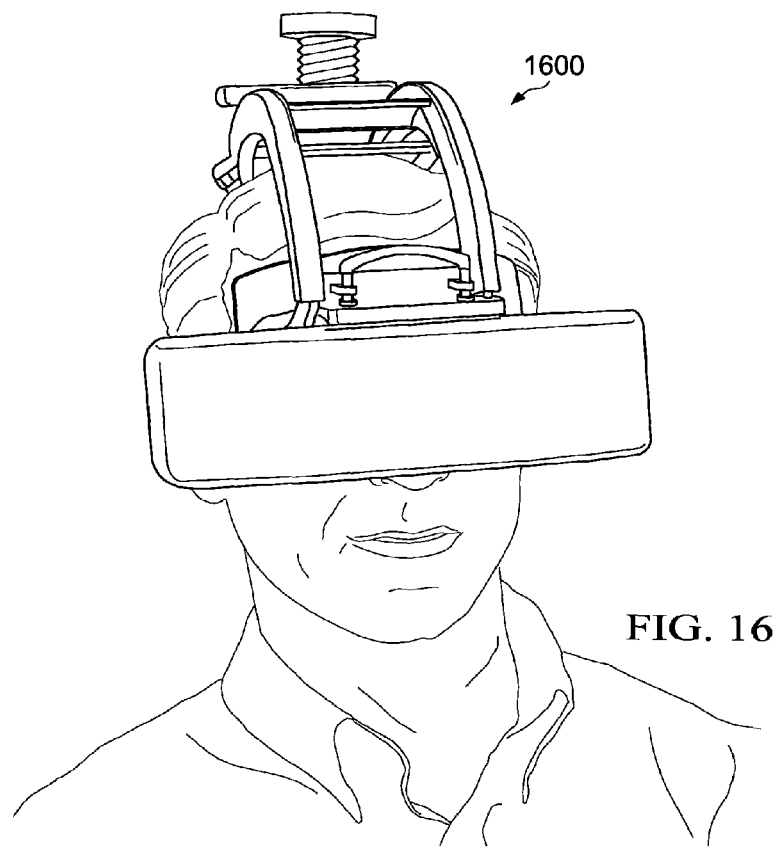
FIG. 16 is a diagram of a head-mounted display system in accordance with an illustrative embodiment.

Turning now to FIG. 16, a diagram of a head-mounted display system is depicted in accordance with an illustrative embodiment. In this example, head-mounted display system 1600 is an example of one implementation for head-mounted display system 348 in FIG. 3. Head-mounted display system 1600 is an example of a piSight HMD display system as manufactured by Sensics, Inc.

Figure 17:
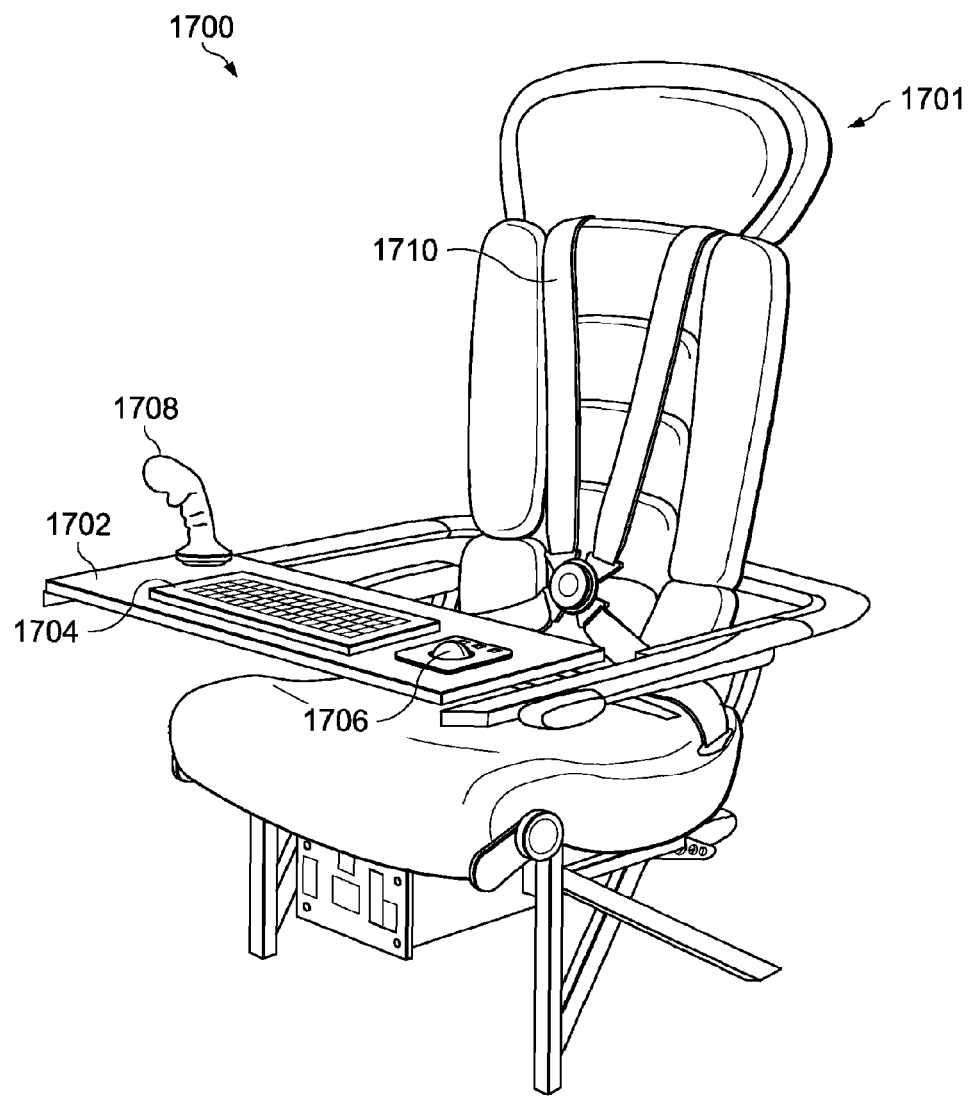
FIG. 17 is a diagram of a lightweight seat for a control station in accordance with an illustrative embodiment.

Turning now to FIG. 17, a diagram of a seat for a control station is depicted in accordance with an illustrative embodiment. In this illustrative example, seat 1701 for control station 1700 is an example of one implementation for seat 304 for control station 308 in FIG. 3. Seat 1701 includes work surface 1702 configured to hold keyboard 1704, mouse 1706, and joystick 1708. As depicted in this example, seat 1701 has restraint 1710.

Figure 18:
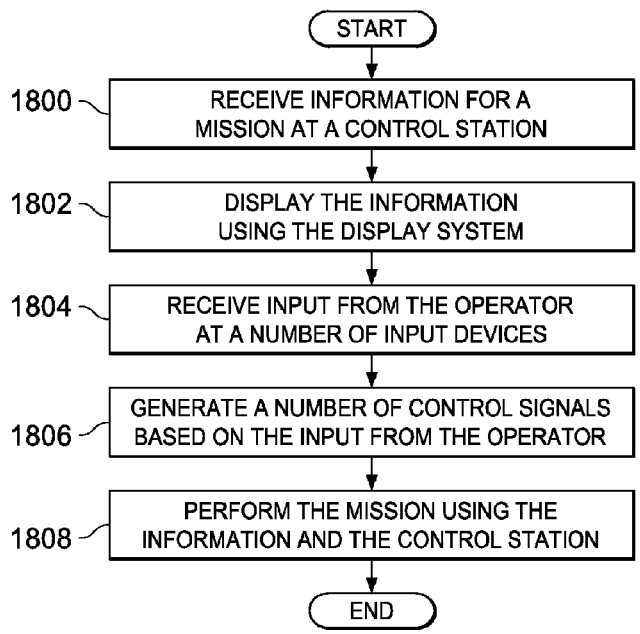
FIG. 18 is a flowchart of a process for performing a mission using a control station in accordance with an illustrative embodiment.

With reference now to FIG. 18, a flowchart of a process for performing a mission using a control station is depicted in accordance with an illustrative embodiment. The process illustrated in FIG. 18 may be implemented using a control station such as, for example, control station 308 in control environment 300 in FIG. 3.

The process begins by receiving information for a mission at a control station (operation 1800). The control station comprises a display system, a motion capture system, a number of input devices, a seat, and a processor unit. The display system is configured to be worn on the head of an operator and to present a display to the operator. The motion capture system is configured to track movement of the head of the operator. The number of input devices is associated with the seat. The processor unit is configured to execute program code to generate the display and to adjust the display in response to detecting commands from the number of input devices and/or movement of the head of the operator.

The process then displays the information using the display system (operation 1802). The process receives input from the operator at a number of input devices (operation 1804). The process then generates a number of control signals based on the input from the operator (operation 1806). These control signals may be used to control a platform, such as an aircraft, a submarine, a spacecraft, a land vehicle, an unmanned aerial vehicle, a ground station, and/or some other suitable platform. The mission is performed using the information and the control station (operation 1808), with the process terminating thereafter.

Figure 19:
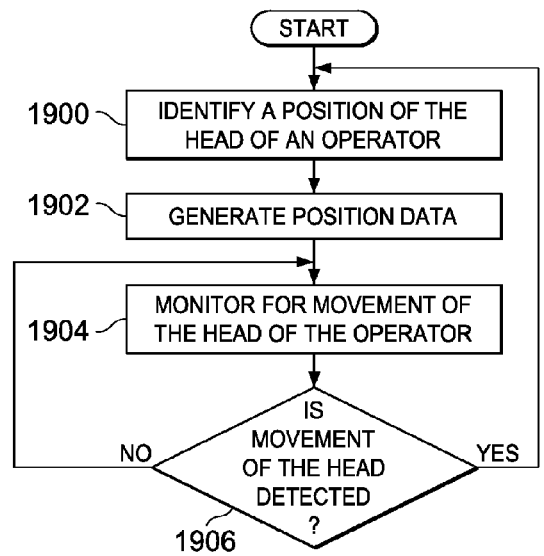
FIG. 19 is a flowchart of a process used by a motion capture system in accordance with an illustrative embodiment.

With reference now to FIG. 19, a flowchart of a process used by a motion capture system is depicted in accordance with an illustrative embodiment. The process illustrated in FIG. 19 may be implemented by a motion capture system such as, for example, motion capture system 309 in FIG. 3.

The process begins by identifying a position of the head of an operator (operation 1900). For example, the motion capture system may identify the position of the head of an operator in three dimensions. The process then generates position data (operation 1902). The process monitors for movement of the head of the operator (operation 1904). In these illustrative examples, the motion capture system may monitor for any change in the position and/or orientation of the head of the operator.

A determination is made as to whether movement of the head is detected (operation 1906). If no movement of the head is detected, the process returns to operation 1904. If movement is detected, the process returns to operation 1900 to identify the new position of the head of the operator. In this manner, the motion capture system is used to continuously track movement of and generate position data for the head of the operator.

Figure 20:
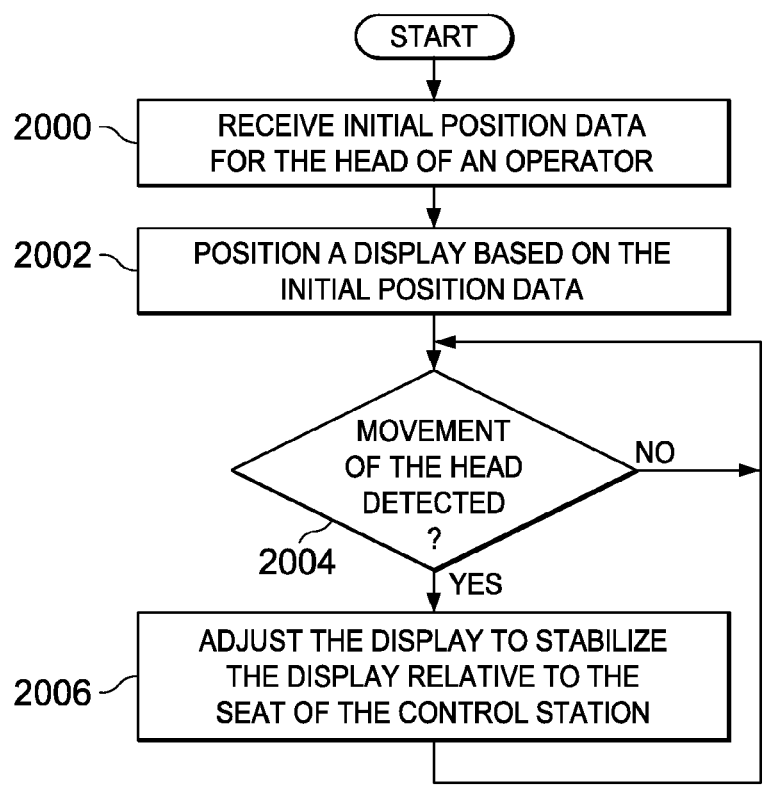
FIG. 20 is a flowchart of a process for stabilizing a display in accordance with an illustrative embodiment.

With reference now to FIG. 20, a flowchart of a process for stabilizing a display is depicted in accordance with an illustrative embodiment. The process illustrated in FIG. 20 may be implemented using, for example, without limitation, motion capture system 309 and data processing system 360 at control station 308 in FIG. 3.

The process begins by receiving initial position data for the head of an operator (operation 2000). The initial position data for the head of the operator is generated by the motion capture system. The initial position data is received at a processor unit within the data processing system. The process then positions a display based on the initial position data (operation 2002). For example, the display may be positioned relative to the seat of the control station. In these illustrative examples, the display is presented to the operator using a head-mounted display system. The display is a virtual representation of physical displays in these examples.

The process then determines whether movement of the head of the operator has been detected (operation 2004). The processor unit monitors input from the motion capture system to determine whether movement of the head of the operator has occurred. If no movement has been detected, the process returns to operation 2004 to continue to monitor for movement of the head of the operator.

If movement of the head of the operator is detected, the process then adjusts the display to stabilize the display to the operator as being stationary relative to the control station (operation 2006). In other words, the operator perceives the display to remain in a stationary position relative to the control station even though the operator's head has moved. The processor unit executes program code to make these adjustments to the display. In this manner, the display may remain in a fixed position even with movement of the head of the operator and/or the head-mounted display system. The process then returns to operation 2004.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different illustrative embodiments present an apparatus and method for performing a mission using a control station. The control station comprises a display system, a motion capture system, a number of input devices, a seat associated with the number of input devices, and a processor unit. The display system is configured to be worn on the head of an operator and to present a display to the operator. The motion capture system is configured to track movement of the head of the operator. The processor unit communicates with the display system, the motion capture system, and the number of input devices. The processor unit is configured to execute program code to generate the display and to adjust the display presented to the operator in response to detecting commands from the number of input devices and/or movement of the head of the operator.

The different illustrative embodiments provide a control station that is lighter in weight than currently available control stations. Also, the different illustrative embodiments provide a control station that occupies less space than currently available control stations. The different illustrative embodiments also provide a control station that integrates a number of desired safety features. These safety features may include, for example, without limitation, an integrated oxygen system, seat restraints, and/or other safety equipment. Further, the seat of the control station may be adjustable to accommodate an operator wearing protective gear, such as a chest vest.

The different illustrative embodiments also provide a control station that consumes less power and requires less cooling than currently available control stations. This reduced power consumption may be due to the control station having a single head-mounted display system as opposed to the number of larger physical displays associated with existing control stations. The reduction in the number of display systems also contributes to the reduced generation of heat and the decreased need for cooling.

The different illustrative embodiments also provide a control station with adjustable components that may reduce operator fatigue and accommodate a greater portion of the operator population than current control stations.

The description of the different illustrative embodiments has been presented for purposes of illustration and description, and it is not intended to be exhaustive or limited to the embodiments in the form disclosed. Many modifications and variations will be apparent to those of ordinary skill in the art.

Although the different illustrative embodiments have been described with respect to aircraft, the different illustrative embodiments also recognize that some illustrative embodiments may be applied to other types of platforms. For example, without limitation, other illustrative embodiments may be applied to a mobile platform, a stationary platform, a land-based structure, an aquatic-based structure, a space-based structure, and/or some other suitable object. More specifically, the different illustrative embodiments may be applied to, for example, without limitation, a surface ship, a tank, a personnel carrier, a train, a spacecraft, a space station, a submarine, an automobile, an airline operations center, a power plant, a manufacturing facility, an unmanned vehicle control center, a building, and/or other suitable platforms.

Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A first control station located in a first platform, the first control station comprising:
   a control system configured to receive information for a mission to be performed collaboratively using the information and the first control station and a control station;
   a display system configured to: be worn on a head of an operator of the first control station, and to present a display to the operator, such that the display comprises three virtual representations of physical windows presenting data, each of the three virtual representations configured to move relative to the other two, the display being configured to: remain stationary in three dimensions relative to the first control station during movement of the head, the display system further configured to communicate within the first platform and between the first platform and a second platform, and exchange information for collaborative problem solving with the second control station, the second control station being in one of: the first platform, and the second platform, such that when the first control station and the second control station are both located in the first platform, each physical window is reconfigurable to be visible by a first operator at the first control station in the first platform and a second operator at the second control station in the first platform simultaneously while the first operator at the first control station and the second operator at the second control station are visible to each other;

an inertial sensor motion capture system configured to track movement of the head;

a user input device configured to adjust: a size, an orientation, and arrangement of a number of displays in the display system;

a seat associated with the user input device, wherein the seat has a side, and further wherein the side has an arm, wherein the arm comprises a stowage area;

a control station oxygen system comprising: an oxygen source, and a conduit system comprising tubing, the oxygen source and the tubing being in a location consisting of at least one of: attached to the seat, within the seat, and as a part of the seat;

a work surface, such that the work surface is pivotally connected to a mount, such that the mount and the work surface retractably store within the stowage area of the arm; and a processor unit in communications with the display system, the motion capture system, and the user input device, wherein the processor unit is configured to execute program code to generate the display and adjust the display presented to the operator in response to detecting movement of the head of the operator.

2. The first control station of claim 1 further comprising: safety equipment associated with the seat.

3. The first control station of claim 1, wherein the oxygen source is an oxygen tank.

4. The first control station of claim 1, wherein the user input device is selected from at least one of a keyboard, a trackball, a hand controller, a foot controller, a gesture detection system, a mouse, a fingertip tracking system, a microphone, and a joy stick.

5. The first control station of claim 1, wherein the seat is an adjustable seat.

6. The first control station of claim 1, wherein the seat comprises:
a frame;
the arm, which is a first arm associated with the frame;
a second arm associated with the frame;
a first work surface, of the work surface, moveably attached to the first arm; and
a second work surface, of the work surface, moveably attached to the second arm, wherein the first work surface and the second work surface are configured to move between a deployed state and a closed state, and the first work surface and the second work surface form a single work surface when in the deployed state.

7. The first control station of claim 6, wherein the first work surface is configured to slide along the first arm and the second work surface is configured to slide along the second arm.

8. The first control station of claim 6, wherein the user input device comprises a keyboard having a first section attached to the first work surface and a second section attached to the second work surface.

9. The first control station of claim 7, wherein the user input device further comprises a pointing device attached to one of the first work surface and the second work surface.

10. The first control station of claim 1, wherein the processor unit is located in at least one of a data processing system associated with the seat, the display system, and a remote data processing system.

11. The first control station of claim 1, wherein the first platform is selected from one of a stationary platform, a land-based structure, an aquatic-based structure, a space-based structure, an aircraft, a surface ship, a tank, a personnel carrier, a train, a spacecraft, a space station, a submarine, an automobile, an airline operations center, a power plant, a manufacturing facility, an unmanned vehicle control center, and a building.

12. The first control station of claim 11, wherein the user input device is configured to control operation of the platform.

13. A method for performing a mission, the method comprising:
receiving, at a control system, information for the mission;
performing the mission using the information and a first control station collaboratively with a second control station, such that using the first control station comprises:
presenting, using a display system configured to be worn on a head of a first operator, a display to the first operator at the first control station;
presenting the display comprising three virtual representations of physical windows presenting data, each of the three virtual representations being movable relative to the other two, the display being configured to remain stationary in three dimensions relative to the first control station during a movement of the head, the display system further configured to communicate within a first platform and between the first platform and a second platform, and exchange information for collaborative problem solving with the second control station, the second control station being in one of: the first platform, and the second platform, such that when the first control station and the second control station are both located in the first platform, each physical window being reconfigurable to be visible by the first operator at the first control station in the first platform and a second operator at the second control station in the first platform simultaneously while the first operator at the first control station and the second operator at the second control station are visible to each other;
tracking, using an inertial sensor motion capture system, the movement of the head;
associating a user input device configured to adjust: a size, an orientation, and arrangement of a number of displays in the display system, with a seat associated with the first control station, the seat comprising:
a side, the side comprising an arm, wherein the arm comprises a stowage area;
a work surface, such that the work surface is pivotally connected to a mount, wherein the mount and the work surface retractably store within the stowage area of the arm;
a processor unit configured to execute program code to generate the display and adjust the display presented to the operator in response to detecting movement of the head of the first operator; and
an oxygen system comprising: an oxygen source, and a conduit system comprising tubing, the oxygen source and the tubing being in a first location consisting of at least one of: attached to the seat, within the seat, and as a part of the seat.

14. The method of claim 13 further comprising:
displaying the information using the display system;
receiving user input at the user input device; and
generating a control signal.

15. The method of claim 13, wherein the first control station is located remote to the first platform.

16. The method of claim 15, remote to the first platform comprising one of: a stationary platform, a land-based structure, an aquatic-based structure, a space-based structure, an aircraft, a surface ship, a tank, a personnel carrier, a train, a spacecraft, a space station, a submarine, an automobile, an airline operations center, a power plant, a manufacturing facility, an unmanned vehicle control center, and a building.

* * * * *